United States Patent
Yamashita

(10) Patent No.: US 8,064,634 B2
(45) Date of Patent: Nov. 22, 2011

(54) HISTORY IMAGE GENERATING SYSTEM, HISTORY IMAGE GENERATING METHOD, AND RECORDING MEDIUM IN WHICH IS RECORDED A COMPUTER PROGRAM

(75) Inventor: Taketoshi Yamashita, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 908 days.

(21) Appl. No.: 12/058,161

(22) Filed: Mar. 28, 2008

(65) Prior Publication Data

US 2009/0074232 A1     Mar. 19, 2009

(30) Foreign Application Priority Data

Sep. 13, 2007     (JP) .................................. 2007-238465

(51) Int. Cl.
G06K 9/00       (2006.01)
H04N 1/40       (2006.01)
(52) U.S. Cl. ...................................... 382/100; 358/3.28
(58) Field of Classification Search .................. 382/100, 382/254; 358/3.28, 3.29; 345/89, 581; 380/243, 380/283
See application file for complete search history.

(56) References Cited

U.S. PATENT DOCUMENTS

| | | | | |
|---|---|---|---|---|
| 6,418,424 B1 * | 7/2002 | Hoffberg et al. | ............... | 706/21 |
| 7,130,442 B2 * | 10/2006 | Braudaway et al. | .......... | 382/100 |
| 7,242,988 B1 * | 7/2007 | Hoffberg et al. | ................ | 700/28 |

| | | | |
|---|---|---|---|
| 2006/0209349 A1 | 9/2006 | Tabata | |
| 2007/0008586 A1 | 1/2007 | Tamai et al. | |
| 2007/0115495 A1 | 5/2007 | Ebitani | |
| 2009/0136088 A1 | 5/2009 | Tabata | |

FOREIGN PATENT DOCUMENTS

| | | |
|---|---|---|
| JP | 2005-244301 A | 9/2005 |
| JP | 2006262486 A | 9/2006 |
| JP | 2007-019841 A | 1/2007 |
| JP | 2007-148487 A | 6/2007 |
| JP | 2007-166510 A | 6/2007 |
| JP | 2007-214611 A | 8/2007 |

OTHER PUBLICATIONS

Japanese Office Action dated Feb. 9, 2010 for Japanese Patent Application No. 2007-238465 and English-language translation.
Japanese Office Action dated Jun. 29, 2010 for Japanese Patent Application No. 2007-238465 and English-language translation.

* cited by examiner

*Primary Examiner* — Samir Ahmed
*Assistant Examiner* — Mehdi Rashidian
(74) *Attorney, Agent, or Firm* — Sughrue Mion, PLLC

(57) ABSTRACT

A history image generating system and method is configured such that a determining unit determines whether or not an image to be combined with a history image stored as a history is a digital watermark image, and when it has been determined by the determining unit that the image is a digital watermark image, a processing unit performs, with respect to the digital watermark image, processing including enhancement processing such that the visibility of the image is increased, and a generating unit generates an image in which the digital watermark image with respect to which processing has been performed by the processing unit and the history image are combined. Further, a recording medium stores a computer program that causes a computer to execute operation of each unit of this history image generating system.

11 Claims, 6 Drawing Sheets

(PROCESSING OF CONTROL DEVICE)

0. ORDINARY COMPOSITE MODE

3. BLURRING-1 BLUR FILTER

1. ENHANCEMENT-1
(EDGE ENHANCEMENT)

2. ENHANCEMENT-2
(EDGE ENHANCEMENT-
CONTRAST ENHANCEMENT)

3. BLURRING-2 PATTERN REPLACEMENT

DIGITAL WATERMARK

4. THROUGH

US 8,064,634 B2

HISTORY IMAGE GENERATING SYSTEM, HISTORY IMAGE GENERATING METHOD, AND RECORDING MEDIUM IN WHICH IS RECORDED A COMPUTER PROGRAM

CROSS-REFERENCE TO RELATED APPLICATION

This application claims priority under 35 USC 119 from Japanese Patent Application No. 2007-238465 filed Sep. 13, 2007.

BACKGROUND OF THE INVENTION

1. Technical Field

This invention relates to a history image generating system, a history image generating method, and a recording medium in which is recorded a computer program.

2. Related Art

Conventionally, image generating apparatus that generate thumbnail images by reducing and combining annotation data and digital documents have been known. Further, generally, a printing apparatus has been known which, when the printing apparatus has performed printing, for example, with respect to the output of image data in which a digital document and a digital watermark image whose visibility is low to a user are combined, generates a history image (image log) of the image data and saves the generated history image, and when the above-described technology is applied to this printing apparatus, an image generating system that generates a history image by reducing and combining a digital watermark image and a digital document is conceivable.

SUMMARY OF THE INVENTION

An aspect of the invention provides a history image generating system which includes: a determining unit that determines whether or not an image to be combined with a history image stored as history is a digital watermark image; a processing unit which, when it has been determined by the determining unit that the image is a digital watermark image, performs, with respect to the digital watermark image, processing including enhancement processing such that the visibility of the image is increased; and a generating unit that generates a composite image in which the digital watermark image with respect to which processing has been performed by the processing unit and the history image are combined.

BRIEF DESCRIPTION OF THE DRAWINGS

An exemplary embodiment of the present invention will be described in detail based on the following figures, in which.

DETAILED DESCRIPTION OF THE INVENTION

Below, an exemplary embodiment of a history image generating system of the present invention will be described in detail with reference to the drawings.

Figure 1:
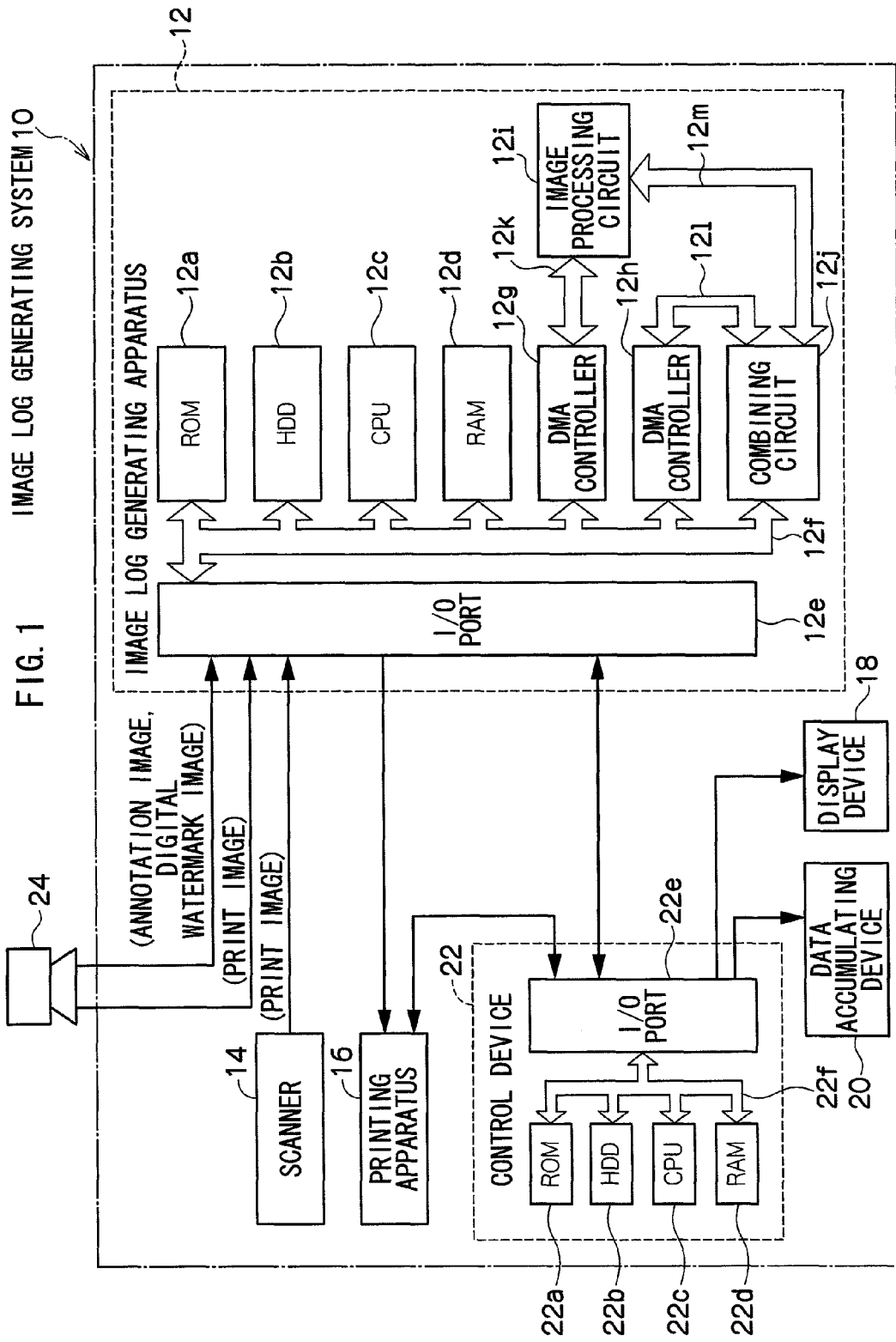
FIG. 1 is a general diagram showing an exemplary embodiment of the present invention.

As shown in FIG. 1, an image log generating system 10 serving as the history image generating system of the exemplary embodiment of the present invention is disposed with an image log generating apparatus 12, a scanner 14 that reads a document and outputs image data (e.g., RGB image data), a printing apparatus 16 that executes printing on the basis of inputted image data, a display device 18 that is configured to include a display such as a liquid crystal display and performs display on the basis of inputted image data, a data accumulating device 20 that is configured to include a magnetic disk device and accumulates (stores) an image log, and a control device 22.

When an instruction to execute printing is inputted to the image log generating apparatus 12 from an operation panel (not shown) that receives instructions or an external device 24 such as an external personal computer, the image log generating apparatus 12 combines a print image (e.g., RGB image data) that has been inputted from the scanner 14 or the external device 24 and an annotation image and a digital watermark image (e.g., each being RGB image data) that have been inputted from the external device 24, outputs image data of the composite image to the printing apparatus 16, and causes the printing apparatus 16 to execute printing of the composite image. Further, the image log generating apparatus 12 generates an image log (history image) of the print image, the annotation image and the digital watermark image for which there has been an instruction to execute printing and outputs the generated image log to the control device 22.

The image log generating apparatus 12 is configured by a microcomputer configured to include: a ROM 12a serving as a storage medium in which is stored a basic program such as an OS; a hard disk drive (HDD) 12b serving as a storage medium in which are stored a program for executing an image log generation processing routine whose details will be described below, a program for executing input image determination processing whose details will be described below and a program for executing various types of processing routines, and filter types showing integer values of 0 to 4 that are preset and necessary when executing the image log generation processing routine; a CPU 12c that reads and executes programs from the ROM 12a and the HDD 12b; a RAM 12d that temporarily stores image identification information when the input image determination processing has been executed, inputted print images, annotation images, digital watermark images, and various types of data; and an input/output (I/O) port 12e. The ROM 12a, the HDD 12b, the CPU 12c, the RAM 12d and the I/O port 12e are interconnected by a bus 12f.

The details of each of the aforementioned filter types will described later, but 0 represents an "ordinary composite mode", 1 represents an "enhancement-1 mode", 2 represents an "enhancement-2 mode", 3 represents a "blurring (mosaic) mode", and 4 represents a "through mode".

Moreover, connected to the bus 12f are a DMA controller 12g which, when an instruction to execute printing has been inputted, transfers the print image that has been inputted from the scanner 14 or the external device 24 and temporarily stored in the RAM 12*d* to an image processing circuit 12*i* by DMA and a DMA controller 12*h* which, when an instruction to execute printing has been inputted, transfers the annotation image and the digital watermark image that have been inputted from the external device 24 and temporarily stored in the RAM 12*d* to a combining circuit 12*j* by DMA.

The image processing circuit 12*i* is connected to the DMA controller 12*g* via a bus 12*k* and performs predetermined image processing with respect to the inputted print image.

The combining circuit 12*j* is connected to the DMA controller 12*h* via a bus 12*l* and to the image processing circuit 12*i* via a bus 12*m*. The combining circuit 12*j* combines the inputted print image, annotation image and digital watermark image. Thus, the image combined by the combining circuit 12*j* is outputted to the printing apparatus 16 via the I/O port 12*e* by the CPU 12*c* on the basis of an instruction to execute printing, and the combined image is printed by the printing apparatus 16.

When transfer is completed, the DMA controllers 12*g* and 12*h* notify the CPU 12*c* of information (channel information) representing the transmission path (channel) that was used during transfer.

The details will be described later, but the CPU 12*c* can thus determine, by discriminating the channel information of which it has been notified, whether the inputted image is a print image or whether the inputted image is either one of an annotation image and a digital watermark image. For example, in the present exemplary embodiment, when information indicating that the transmission path that was used during transfer is the bus 12*k* is included in the channel information of which the CPU 12*c* has been notified, the CPU 12*c* can determine that the inputted image is a print image, and when information indicating that the transmission path that was used during transfer is the bus 12*l* is included in the channel information of which the CPU 12*c* has been notified, the CPU 12*c* can determine that the inputted image is either one of an annotation image and a digital watermark image.

The control device 22 is configured by a microcomputer configured to include: a ROM 22*a* serving as a storage medium in which is stored a basic program such as an OS; a hard disk drive (HDD) 22*b* serving as a storage medium in which are stored a program for executing an image log generation processing routine whose details will be described below, a program for executing a thumbnail image display processing routine whose details will be described below, and a program for executing various types of processing routines; a CPU 22*c* that reads and executes programs from the ROM 22*a* and the HDD 22*b*; a RAM 22*d* that temporarily stores data; and an input/output (I/O) port 22*e*. The ROM 22*a*, the HDD 22*b*, the CPU 22*c*, the RAM 22*d* and the I/O port 22*e* are interconnected by a bus 22*f*.

Figure 2:
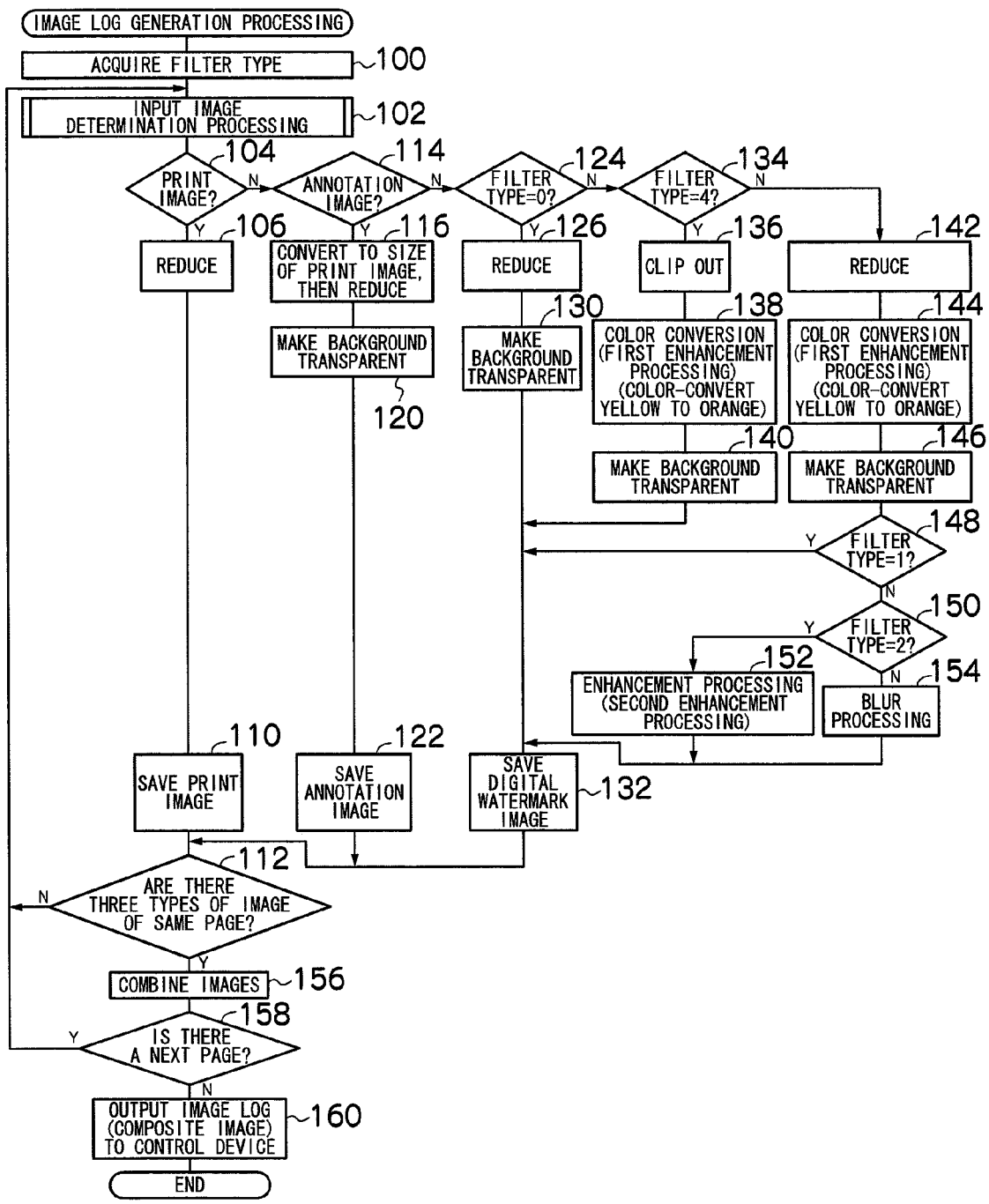
FIG. 2 is a diagram showing a flowchart of an image log generation processing routine performed by a CPU of an image log generating apparatus in the exemplary embodiment.
Figure 3:
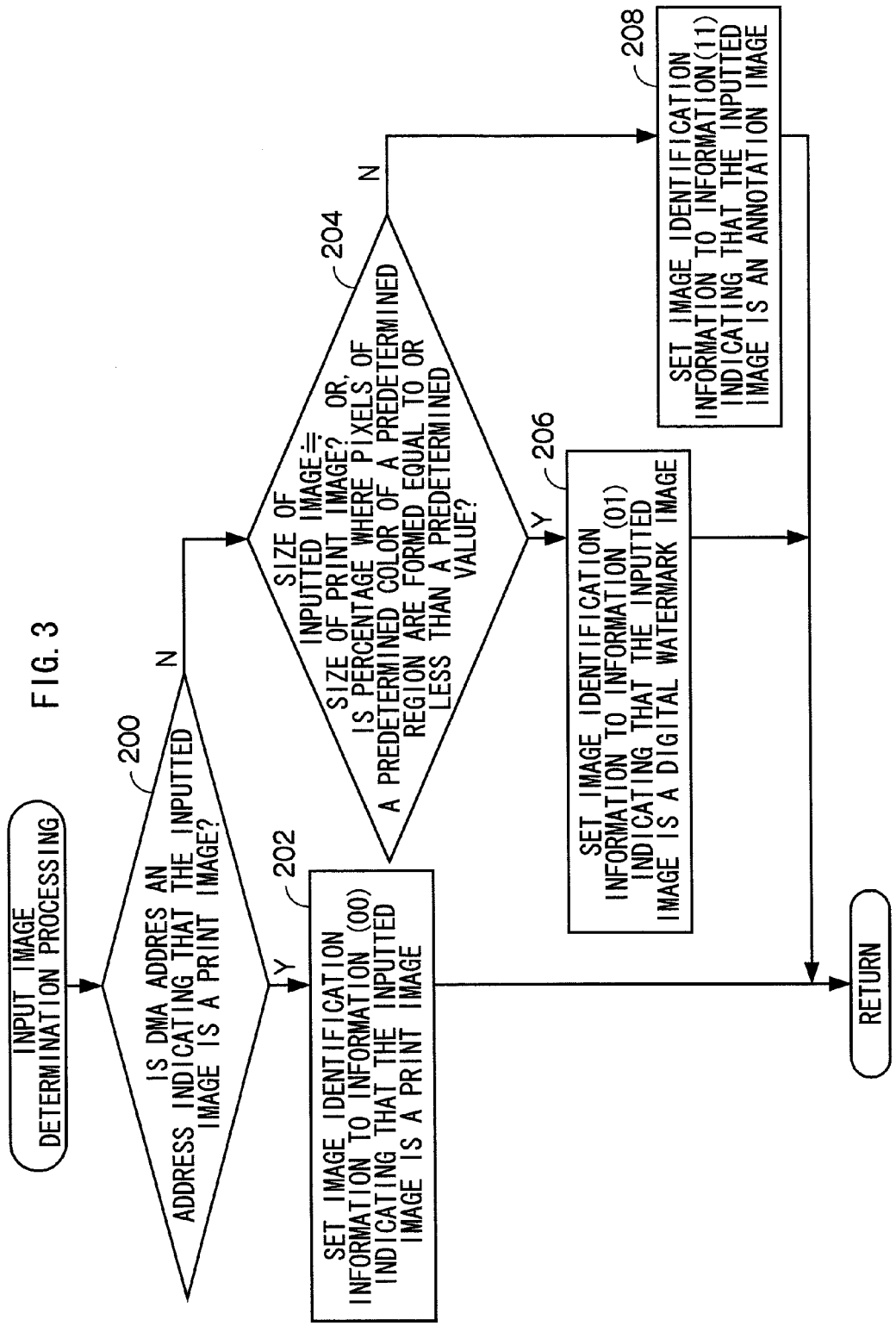
FIG. 3 is a diagram showing a flowchart of an input image determination processing routine performed by the CPU of the image log generating apparatus in the exemplary embodiment.

Next, the image log generation processing routine executed by the CPU 12*c* of the image log generating apparatus 12 will be described using FIG. 2 and FIG. 3. In the present exemplary embodiment, this image log generation processing routine is executed when an instruction to execute printing is inputted and a print image serving as a history image stored as a history, an annotation image to be combined in the print image, and a digital watermark image to be combined in the print image are inputted.

First, in step 100, the CPU 12*c* reads the filter types stored in the HDD 12*b* and acquires a filter type.

In next step 102, the CPU 12*c* performs input image determination processing.

The input image determination processing will be described using FIG. 3. First, in step 200, the CPU 12*c* determines whether or not the inputted image is a print image. For example, in step 200, when information indicating that the transmission path that was used during transfer is the bus 12*k* is included in the channel information of which the CPU 12*c* has been notified, the CPU 12*c* determines that the inputted image is a print image, and when information indicating that the transmission path is the bus 12*k* is not included, the CPU 12*c* determines that the inputted image is not a print image.

When it has been determined in step 200 that the inputted image is a print image, then in next step 202, the CPU 12*c* sets (stores) 0 (00) in the RAM 12*d* as 2-bit input image identification information for identifying the inputted image. Then, the CPU 12*c* ends the input image determination processing.

On the other hand, when it has been determined in step 200 that the inputted image is not a print image, that is, when it has been determined that the inputted image is an annotation image or a digital watermark image, then in next step 204, the CPU 12*c* determines whether or not the difference between the vertical and horizontal image size (image dimension) of the inputted image and the vertical and horizontal image size of a print image that has been predetermined is within a predetermined value. When the inputted image is a digital watermark image, it is conceivable for its image size to be substantially equal to the vertical and horizontal image size of a print image, so when that difference is within the predetermined value, the CPU 12*c* can determine that the inputted image is a digital watermark image, and an annotation image generally has a smaller image size than that of a print image, and when the inputted image is an annotation image, it is conceivable for the difference between its image size and the vertical and horizontal image size of a print image to be larger than the predetermined value, so when that difference is not within the predetermined value, the CPU 12*c* can determine that the inputted image is an annotation image.

It will be noted that the CPU 12*c* may also be configured such that, in step 204, when a percentage of a region where pixels of a predetermined color such as yellow, for example, are formed in a predetermined region of the inputted image (e.g., in the case of 1 bit/pixel, the percentage of a region where a bit shows 1 in a predetermined region of image data of yellow) is equal to or less than a predetermined value, then the CPU 12*c* determines that the inputted image is a digital watermark image, and when the percentage is greater than the predetermined value, then the CPU 12*c* determines that the inputted image is an annotation image. In regard to this predetermined value, the CPU 12*c* may experimentally or statistically determine the percentage of a region where pixels of a predetermined color are formed in a predetermined region in the case of a digital watermark image and the percentage of a region where pixels of a predetermined color are formed in a predetermined region in the case of an annotation image and, of the determined percentages, determine the optimum percentage where the potential for the inputted image to be a digital watermark image but not an annotation image is high, and set this determined percentage as the predetermined value.

When a YES determination has been made in step 204, then in next step 206, the CPU 12*c* sets (stores) 1 (01) in the RAM 12*d* as input image identification information. Then, the CPU 12*c* ends the input image determination processing.

On the other hand, when a NO determination has been made in step 204, then in next step 208, the CPU 12*c* sets (stores) 3 (11) in the RAM 12*d* as input image identification information. Then, the CPU 12*c* ends the input image determination processing.

In next step 104, the CPU 12*c* reads the input image identification information from the RAM 12*d* and determines whether or not a print image has been inputted by determining whether or not the read input image identification information shows 0.

When it has been determined in step 104 that the input image identification information shows 0, then in next step 106, the CPU 12*c* performs reduction processing that reduces the image size of the inputted print image by a predetermined reduction ratio. For example, the CPU 12*c* performs reduction processing that reduces a print image with an image size of 7200 pixels×5100 lines to an image size of 960 pixels×680 lines by a predetermined reduction ratio.

In next step 110, the CPU 12*c* causes the image data of the print image reduced in step 106 to be stored in the HDD 12*b*. Then, the CPU 12*c* moves to step 112.

On the other hand, when it has been determined in step 104 that the input image identification information does not show 0, then in step 114, the CPU 12*c* determines whether or not an annotation image has been inputted by determining whether or not the read input image identification information shows 3.

When it has been determined in step 114 that the input image identification information shows 3, then in step 116, the CPU 12*c* changes the background of the inputted annotation image to a predetermined color such as white, changes the image size of the annotation image and the image size of a predetermined print image to be identical, and performs reduction processing that reduces the annotation image whose image size has been changed to be identical to that of the predetermined print image by the same reduction ratio as the reduction ratio by which the print image had been reduced in step 106. For example, in step 116, when the image size of the predetermined print image is 7200 pixels×5100 lines and the image size of the inputted annotation image is 2000 pixels×1000 lines, then the CPU 12*c* changes the image size of the inputted annotation image to 7200 pixels×5100 lines and performs reduction processing that reduces the annotation image whose image size has been changed by the predetermined reduction ratio by which the print image had been reduced in step 106, such as reduction processing that reduces the annotation image to an image size of 960 pixels×680 lines.

In next step 120, the CPU 12*c* performs transparency processing that makes the background of the annotation image that has been reduced in step 116 transparent. For example, in step 120, when the background has been made white in step 116, then the CPU 12*c* performs transparency processing that makes the white in the background transparent.

In next step 122, the CPU 12*c* causes the image data of the annotation image with respect to which transparency processing has been performed in step 120 to be stored in the HDD 12*b*. Then, the CPU 12*c* moves to step 112.

On the other hand, when it has been determined in step 114 that the input image identification information does not show 3, that is, when it has been determined that the input image identification information shows 1 and the inputted image is a digital watermark image, then in step 124, then CPU 12*c* determines whether or not the filter type that has been acquired in step 100 is 0.

When it has been determined in step 124 that the filter type is 0, then in next step 126, the CPU 12*c* performs reduction processing that reduces the inputted digital watermark image by the same reduction ratio as the predetermined reduction ratio when the print image had been reduced in step 106. For example, in step 126, when a digital watermark image with an image size of 7200 pixels×5100 lines has been inputted, then the CPU 12*c* performs reduction processing that reduces this digital watermark image by the predetermined reduction ratio when the print image had been reduced in step 106, such as reduction processing that reduces the digital watermark image to an image size of 960 pixels×680 lines.

In next step 130, the CPU 12*c* performs transparency processing that makes the background of the digital watermark image that has been reduced in step 126 transparent. For example, in step 130, when the background is white, then the CPU 12*c* performs transparency processing that makes the white in the background transparent.

In next step 132, the CPU 12*c* causes the image data of the digital watermark image with respect to which transparency processing has been performed in step 130 to be stored in the HDD 12*b*. Then, the CPU 12*c* moves to step 112.

On the other hand, when it has been determined in step 124 that the filter type is not 0, then in next step 134, the CPU 12*c* determines whether or not the filter type is 4.

When it has been determined in step 134 that the filter type is 4, then in next step 136, the CPU 12*c* performs clipping processing that clips out the inputted digital watermark image such that it becomes the same image size as the image size of the print image after reduction when reduction processing had been performed in step 106. At this time, the portion to be clipped out may be an arbitrary portion of the digital watermark image. For example, in step 134, when the image size of the print image after reduction is 960 pixels×680 lines, then the CPU 12*c* performs clipping processing that clips out an arbitrary portion of the digital watermark image such that its image size becomes 960 pixels×680 lines.

In next step 138, the CPU 12*c* performs color conversion processing that converts a color of a predetermined color of the digital watermark image with respect to which clipping processing has been performed in step 136 to a color whose visibility is higher. For example, in step 138, the CPU 12*c* uses a lookup table in which are correlated image data of yellow and image data of orange whose visibility is high in comparison to yellow and converts yellow to orange. One example of a color conversion method is a method that converts colors using a lookup table. It will be noted that the CPU 12*c* may also be configured such that, in step 138, it converts cyan to orange using a lookup table in which are correlated image data of cyan and image data of orange whose visibility is high in comparison to cyan.

In next step 140, the CPU 12*c* performs transparency processing that makes the background of the digital watermark image that has been color-converted in step 138 transparent. For example, in step 140, when the background is white, then the CPU 12*c* performs transparency processing that makes the white in the background transparent. Then, the CPU 12*c* moves to step 132.

On the other hand, when it has been determined in step 134 that the filter type is not 4, then in next step 142, the CPU 12*c* performs reduction processing that reduces the inputted digital watermark image by the same reduction ratio as the predetermined reduction ratio when the print image had been reduced in step 106. For example, in step 142, when a digital watermark image with an image size of 7200 pixels×5100 lines has been inputted, then the CPU 12*c* performs reduction processing that reduces this digital watermark image by the predetermined reduction ratio when the print image had been reduced in step 106, such as reduction processing that reduces the digital watermark image to an image size of 960 pixels×680 lines.

In next step 144, the CPU 12*c* performs color conversion processing that converts a color of a predetermined color of the digital watermark image with respect to which reduction processing has been performed in step 142 to a color whose visibility is higher. For example, in step 144, the CPU 12*c* uses a lookup table in which are correlated image data of yellow and image data of orange whose visibility is high in comparison to yellow and converts yellow to orange. One example of a color conversion method is a method that converts colors using a lookup table. It will be noted that the CPU 12*c* may also be configured such that, in step 144, it converts cyan to orange using a lookup table in which are correlated image data of cyan and image data of orange whose visibility is high in comparison to cyan.

In next step 146, the CPU 12*c* performs transparency processing that makes the background of the digital watermark image that has been color-converted in step 144 transparent. For example, in step 146, when the background is white, then the CPU 12*c* performs transparency processing that makes the white in the background transparent.

In next step 148, the CPU 12*c* determines whether or not the filter type that has been acquired in step 100 is 1.

In step 148, when it has been determined that the filter type is 1, then the CPU 12*c* moves to next step 132, and when it has been determined that the filter type is not 1, then in next step 150, the CPU 12*c* determines whether or not the filter type is 2.

When it has been determined in step 150 that the filter type is 2, then in next step 152, the CPU 12*c* performs, with respect to the digital watermark image, enhancement processing such that the visibility of the image becomes higher. For example, in step 152, the CPU 12*c* performs, with respect to the digital watermark image, enhancement processing that enhances at least one of edge and contrast.

On the other hand, when it has been determined in step 150 that the filter type is not 2, then in next step 154, the CPU 12*c* administers mosaic processing and blur processing to the digital watermark image. Then, the CPU 12*c* moves to step 132, where the CPU 12*c* causes the image data of the digital watermark image to be stored in the HDD 12*b*, and in next step 112, the CPU 12*c* determines whether or not the print image and the annotation image and the digital watermark image combined in this print image are present by determining whether or not three types of images which are the corresponding print image, annotation image and digital watermark image of the same page have been stored in the HDD 12*b*.

When it has been determined in step 112 that three types of images have not been stored in the HDD 12*b*, then the CPU 12*c* returns to step 102 and again performs the processing from there on. On the other hand, when it has been determined in step 112 that three types of images have been stored in the HDD 12*b*, then in next step 156, the CPU 12*c* reads the print image, the annotation image and the digital watermark image stored in the HDD 12*b*, generates a composite image by combining the print image, the annotation image and the digital watermark image that have been read, and stores the generated composite image in the HDD 12*b*.

In next step 158, the CPU 12*c* determines whether or not an image of a next page following the inputted image is present by determining whether or not it has been able to extract data representing a final page from the image data of the inputted print image.

When the CPU 12*c* determines in step 158 that there is an image of a next page, then the CPU 12*c* returns to step 102 and again performs the processing from there on.

On the other hand, when the CPU 12*c* determines in step 158 that there is no image of a next page, then the CPU 12*c* reads the composite image stored in the HDD 12*b* and outputs the composite image to the control device 22 as an image log.

Figure 4A:
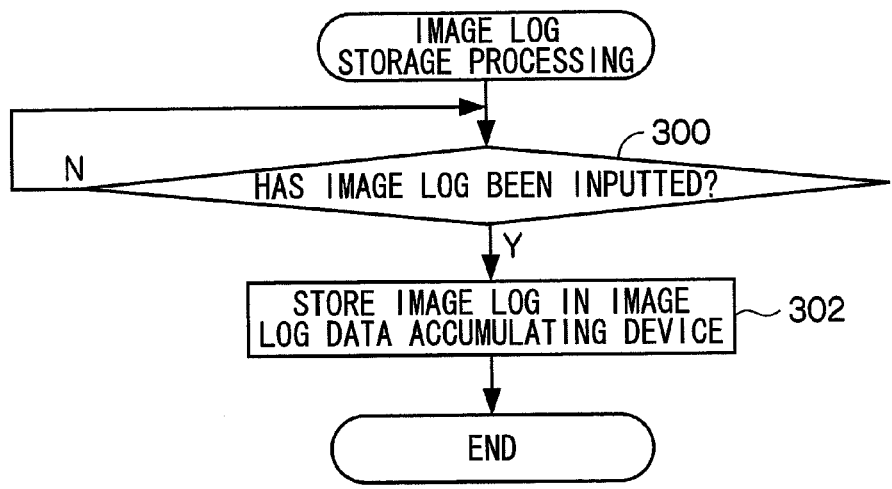
FIG. 4A is a diagram showing a flowchart of an image log storage processing routine performed by a CPU of a control device in the exemplary embodiment.

Next, an image log storage processing routine executed by the CPU 22*c* of the control device 22 will be described using FIG. 4A. In the present exemplary embodiment, this image log storage processing routine is executed every predetermined time interval (e.g., several 10 msec) as a result of a switch (not shown) of the control device 22 being switched ON.

First, in step 300, it is determined whether or not a composite image has been inputted as an image log from the image log generating apparatus 12.

When it has been determined in step 300 that a composite image has been inputted, then in next step 302, the inputted composite image is stored as the image log in the data accumulating device 20.

Figure 4B:
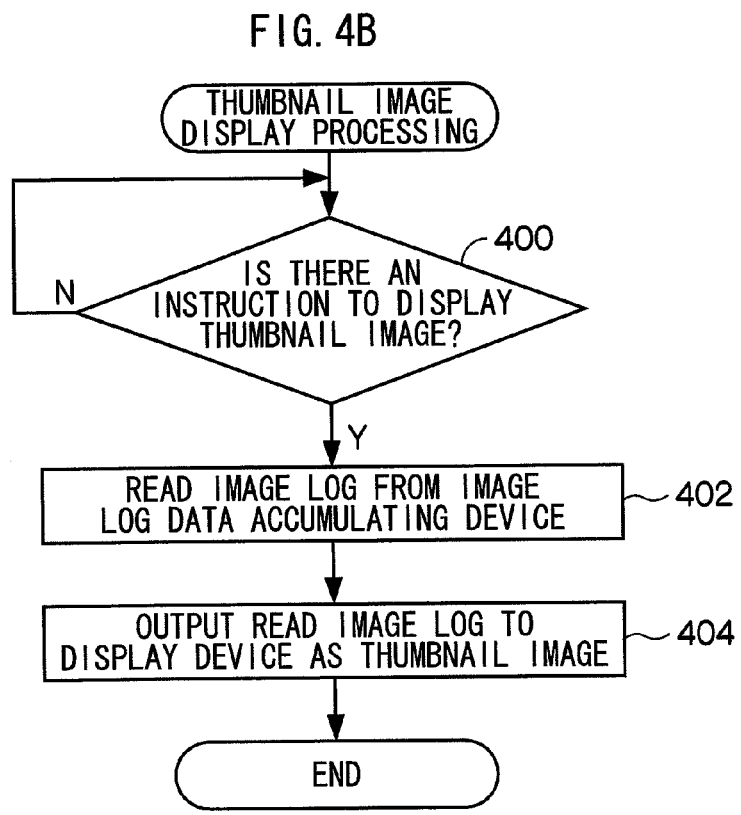
FIG. 4B is a diagram showing a flowchart of a thumbnail image display processing routine performed by the CPU of the control device in the exemplary embodiment.

Next, a thumbnail image display processing routine executed by the CPU 22*c* of the control device 22 will be described using FIG. 4B. In the present exemplary embodiment, this thumbnail image display processing routine is executed every predetermined time interval (e.g., several 10 msec) as a result of a switch (not shown) of the control device 22 being switched ON.

First, in step 400, the CPU 22*c* determines whether or not an instruction to display a thumbnail image has been inputted from an unillustrated operation panel serving as an instruction receiving unit.

When it has been determined in step 400 that an instruction to display a thumbnail image has been inputted, then in next step 402, the CPU 22*c* reads the image log serving as the display target from the data accumulating device 20 on the basis of the inputted instruction.

In next step 404, the CPU 22*c* outputs the read image log to the display device 18 and controls the display device 18 to display the read image log as a thumbnail image.

Figure 5A:
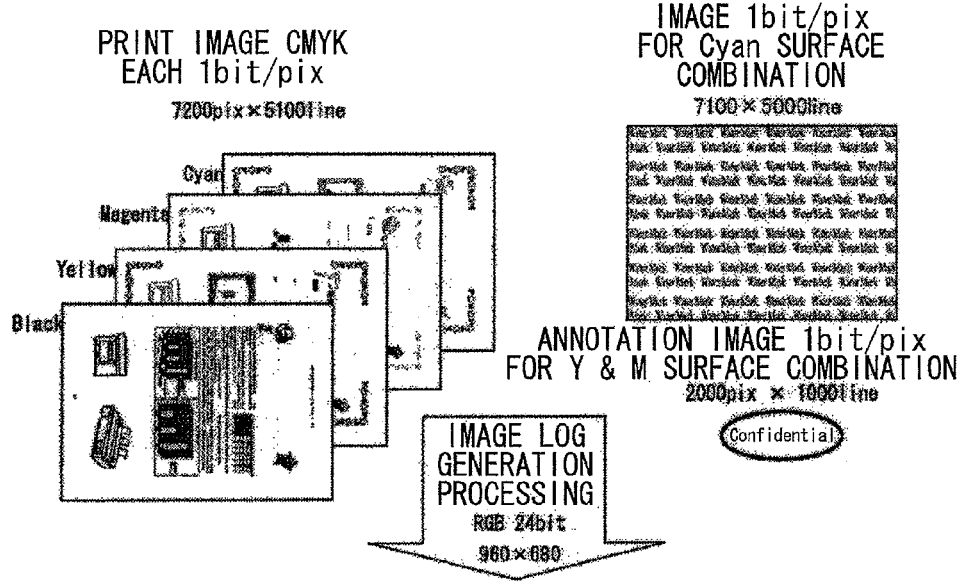
FIGS. 5A to 5G are diagrams showing display results of composite images per filter type in the exemplary embodiment.
Figure 5B:
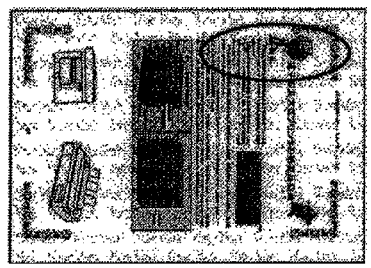

As described above, when the print image, the annotation image and the digital watermark image shown in FIG. 5A have been inputted to the image log generating apparatus 12, when the filter type that had been set beforehand by the user is 0 (ordinary composite mode), the composite image generated in step 156 of the image log generation processing in the present exemplary embodiment is displayed as shown in FIG. 5B on the display device 18 as a thumbnail image by the thumbnail image display processing. In the display of the display device 18 shown in FIG. 5B, it is difficult for the user to view the digital watermark image.

Figure 5E:
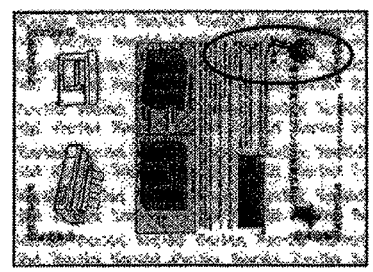
Figure 5C:
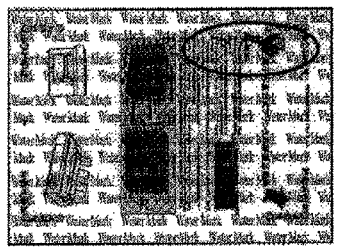

Further, when the print image, the annotation image and the digital watermark image shown in FIG. 5A have been inputted to the image log generating apparatus 12, when the filter type that had been set by the user beforehand is 1 (enhancement-1 mode), color conversion processing that converts a color of a predetermined color of the digital watermark image into a color whose visibility is higher is performed in step 144 of the image log generation processing in the present exemplary embodiment, so the composite image generated in step 156 is displayed on the display device 18 as a thumbnail image by the thumbnail image display processing as a result of the digital watermark image being enhanced as shown in FIG. 5C.

Figure 5D:
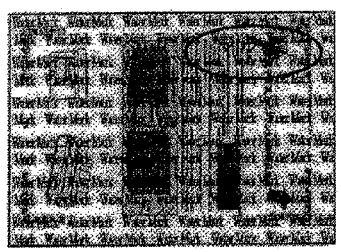

Further, when the print image, the annotation image and the digital watermark image shown in FIG. 5A have been inputted to the image log generating apparatus 12, when the filter type that had been set by the user beforehand is 2 (enhancement-2 mode), color conversion processing that converts a color of a predetermined color of the digital watermark image into a color whose visibility is higher is performed in step 144 of the image log generation processing in the present exemplary embodiment, and enhancement processing such that the visibility of the image becomes higher is performed with respect to the digital watermark image in step 152, so the composite image generated in step 156 is displayed on the display device 18 as a thumbnail image by the thumbnail image display processing as a result of the digital watermark image being enhanced as shown in FIG. 5D even more than in the display in FIG. 5C.

Further, when the print image, the annotation image and the digital watermark image shown in FIG. 5A have been inputted to the image log generating apparatus 12, when the filter type that had been set by the user beforehand is 3 (blurring (mosaic) mode), color conversion processing that converts a color of a predetermined color of the digital watermark image into a color whose visibility is higher is performed in step 144 of the image log generation processing in the present exemplary embodiment, and mosaic processing and blur processing are administered to the digital watermark image in step 154, so as for the composite image generated in step 156, the content of the digital watermark image cannot be grasped but it can be recognized that the digital watermark image has been combined as shown in FIG. 5E on the display device 18 as a thumbnail image by the thumbnail image display processing.

Figure 5F:
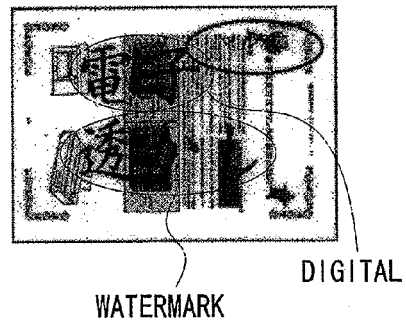

It will be noted that, although an example has been described where, when the filter type that had been set by the user beforehand is 3 (blurring (mosaic) mode), mosaic processing and blur processing are administered to the digital watermark image in step 154 of the image log generation processing in the present exemplary embodiment, but the present invention is not limited to this and may also be configured to replace the digital watermark image with another image in step 154 when the filter type that had been set by the user beforehand is 3. At this time, the other image with which the digital watermark image has been replaced is displayed as shown in FIG. 5F on the display device 18 as a thumbnail image by the thumbnail image display processing, and although the content of the digital watermark image cannot be grasped, it is displayed such that the presence of the digital watermark image can be recognized.

Figure 5G:
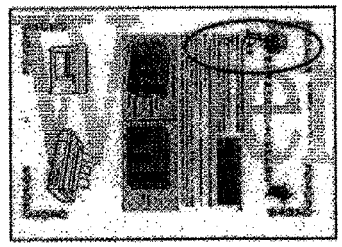

Further, when the print image, the annotation image and the digital watermark image shown in FIG. 5A have been inputted to the image log generating apparatus 12, when the filter type that had been set by the user beforehand is 4 (through mode), clipping processing that clips out the inputted digital watermark image is performed in step 136 of the image log generation processing in the present exemplary embodiment, and color conversion processing that converts a color of a predetermined color of the digital watermark image into a color whose visibility is higher is performed in step 138, so the composite image generated in step 156 is displayed as shown in FIG. 5G on the display device 18 as a thumbnail image by the thumbnail image display processing such that analysis of the digital watermark image is possible and is displayed such that it can be recognized that the digital watermark image is combined.

Further, in the present exemplary embodiment, an example has been described where the composite image is generated in step 156 of the image log generation processing and the composite image is outputted to the control device 22 in step 160, but the invention may also be configured such that the composite image is not generated, the print image, the annotation image and the digital watermark image of the same page are correlated and outputted to the control device 22, the control device 22 correlates the print image, the annotation image and the digital watermark image of the same page and causes them to be stored in the data accumulating device 20.

Further, the exemplary embodiment heretofore described may also be implemented by a program that causes functions to be realized by a computer configured by the CPU 12c, the ROM 12c and the RAM 12d or the CPU 22c, the ROM 22a and the RAM 22d in the image log generating system 10 of FIG. 1. In that case, the program may be stored in the ROM 12a or the ROM 22a, but it is also possible to store the program in a recording medium such as a CD-ROM and provide the program.

While the present invention has been illustrated and described with respect to a specific exemplary embodiment thereof, it is to be understood that the invention is by no means limited thereto and encompasses all changes and modifications which will become possible within the spirits and scope of the invention.

What is claimed is:

1. A history image generating system comprising:
a determining unit that determines whether or not an image to be combined with a history image stored as history is a digital watermark image;
a processing unit which, when it has been determined by the determining unit that the image is a digital watermark image, performs, with respect to the digital watermark image, processing including enhancement processing such that the visibility of the image is increased; and
a generating unit that generates a composite image in which the digital watermark image with respect to which processing has been performed by the processing unit and the history image are combined;
Wherein the processing by processing unit includes at least one of blur processing and mosaic processing performed by the processing unit after the enhancement processing; and wherein the determining unit determines whether or not the image is a digital watermark image on the basis of the image dimensions of the history image and the image or the percentage of a region in which pixels of a predetermined color are formed in a predetermined region of the image.

2. A history image generating system comprising: a determining unit that determines whether or not an image to be combines with a history image stored as history is a digital watermark image; a processing unit which, when it has been determined by the determining unit that the image is a digital watermark image, performs, with respect to the digital watermark image, processing including enhancement processing such that the visibility of the image is increased; and a generating unit that generates a composite image in which the digital watermark image with respect to which processing has been performed by the processing unit and the history image are combined; Wherein the processing by processing unit includes at least one of blur processing and mosaic processing performed by the processing unit after the enhancement processing; wherein the determining unit determines whether or not the image is a digital watermark image on the basis of the image dimensions of the history image and the image or the percentage of a region in which pixels of a predetermined color are formed in a predetermines region of the image; wherein the processing of the processing unit includes clipping processing that clips the composite image to an image dimension corresponding to the history image before the enhancement processing is performed; and wherein the determining unit determines whether or not the image is a digital watermark image on the basis of the image dimensions of the history image and the image or the percentage of a region in which pixels of a predetermined color are formed in a predetermined region of the image.

3. The history image generating system of claim 1, further comprising a control unit that performs control to effect display of the composite image.

4. The history image generating system of claim 1, further comprising a control unit that performs control to effect display of the composite image.

5. The history image generating system of claim 2, further comprising a control unit that performs control to effect display of the composite image.

6. A recording medium in which is stored a computer program for causing a computer to function as:
   a determining unit that determines whether or not an image to be combined with a history image stored as history is a digital watermark image;
   a processing unit which, when it has been determined by the determining unit that the image is a digital watermark image, performs, with respect to the digital watermark image, processing including enhancement processing such that the visibility of the image is increased; and
   a generating unit that generates a composite image in which the digital watermark image with respect to which processing has been performed by the processing unit and the history image are combined;
   Wherein the processing by processing unit includes at least one of blur processing and mosaic processing performed by the processing unit after the enhancement processing; and wherein the determining unit determines whether or not the image is a digital watermark image on the basis of the image dimensions of the history image and the image or the percentage of a region in which pixels of a predetermined color are formed in a predetermined region of the image.

7. The recording medium of claim 6, wherein the processing of the processing unit includes clipping processing that clips the composite image to an image dimension corresponding to the history image before the enhancement processing is performed.

8. The recording medium of claim 6, wherein the computer program includes a program for causing a computer to function as a control unit that performs control to effect display of the composite image.

9. A history image generating method comprising:
   determining whether or not an image to be combined with a history image stored as history is a digital watermark image;
   when it has been determined by the determining unit that the image is a digital watermark image, performing, with respect to the digital watermark image, processing including enhancement processing such that the visibility of the image is increased,
   Wherein the enhancement processing includes at least one of blur processing and mosaic processing performed after the enhancement processing;
   generating a composite image in which the digital watermark image with respect to which processing has been performed and the history image are combined; and
   determining whether or not the image is a digital watermark image on the basis of the image dimensions of the history image and the image to be combined with the history image or the percentage of a region in which pixels of a predetermined color are formed in a predetermined region of the image.

10. The history image generating method of claim 9, wherein the processing including enhancement processing includes clipping processing that clips the composite image to an image dimension corresponding to the history image before the enhancement processing is performed.

11. The history image generating method of claim 9, further comprising performing control to effect display of the composite image.

* * * * *